US009510275B2

(12) United States Patent
Sebeni et al.

(10) Patent No.: US 9,510,275 B2
(45) Date of Patent: Nov. 29, 2016

(54) MULTI-RAT BAND SCAN

(71) Applicant: Apple Inc., Cupertino, CA (US)

(72) Inventors: Johnson O. Sebeni, Fremont, CA (US); Navid Damji, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 14/481,457

(22) Filed: Sep. 9, 2014

(65) Prior Publication Data

US 2016/0073417 A1 Mar. 10, 2016

(51) Int. Cl.
| | |
|---|---|
| H04W 72/08 | (2009.01) |
| H04W 48/16 | (2009.01) |
| H04L 12/00 | (2006.01) |
| H04L 12/64 | (2006.01) |
| H04W 52/02 | (2009.01) |
| H04W 74/00 | (2009.01) |
| H04W 88/06 | (2009.01) |
| H04W 48/18 | (2009.01) |

(52) U.S. Cl.
CPC ............. *H04W 48/16* (2013.01); *H04L 12/00* (2013.01); *H04L 12/6418* (2013.01); *H04W 52/0229* (2013.01); *H04W 48/18* (2013.01); *H04W 74/006* (2013.01); *H04W 88/06* (2013.01)

(58) Field of Classification Search
CPC ............. H04W 72/085; H04W 48/16; H04W 72/0453; H04W 74/006; H04W 88/06; H04W 52/0229; H04W 48/18; H04L 12/00; H04L 12/6418
See application file for complete search history.

(56) References Cited

U.S. PATENT DOCUMENTS

| | | | |
|---|---|---|---|
| 8,346,315 | B2 | 1/2013 | Lindoff et al. |
| 8,543,062 | B2 | 9/2013 | Hildebrand et al. |
| 2004/0253952 | A1 | 12/2004 | Rager et al. |
| 2008/0233955 | A1 | 9/2008 | Narang et al. |
| 2011/0085589 | A1* | 4/2011 | Filipovic ............. H04J 11/0083 375/224 |
| 2013/0217386 | A1 | 8/2013 | Perets et al. |
| 2013/0279376 | A1 | 10/2013 | Ahmadi |
| 2015/0289198 | A1* | 10/2015 | Boixadera ............ H04W 48/14 455/552.1 |

* cited by examiner

*Primary Examiner* — Dang Ton
*Assistant Examiner* — Mandish Randhawa
(74) *Attorney, Agent, or Firm* — Meyertons Hood Kivlin Kowert & Goetzel, P.C.; Jeffrey C. Hood

(57) ABSTRACT

This disclosure relates to multi-RAT band scanning. According to one embodiment, a wireless user equipment (UE) device may perform a power scan of a frequency band. It may be determined whether or not to attempt system acquisition according to each of multiple possible radio access technologies (RATs) at east of multiple frequencies of the frequency band based on the power scan, and system acquisition may be attempted at selected RAT and frequency combinations. Results of the system acquisition attempts may be provided to a system selection module.

13 Claims, 12 Drawing Sheets

MULTI-RAT BAND SCAN

FIELD

The present application relates to wireless devices, and more particularly to a system and method for wireless devices to perform a multi-RAT band scan.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

In some scenarios, as part of its wireless communication functionality, a wireless device may search various radio frequency bands for wireless communication networks. However, as an increasing number of wireless communication technologies are being deployed on an increasing number of frequency bands, this process tends to become more challenging and time- and power-consuming.

SUMMARY

Embodiments are presented herein of methods for wireless devices to scan frequency bands on which multiple radio access technologies (RATs) may be deployed and selectively attempt system acquisition on candidate frequency channels in those frequency bands, and of devices configured to implement the methods.

According to the techniques described herein, a frequency band on which multiple RATs may be deployed may be scanned. For example, a power scan may be performed on the frequency band such that the signal power at the various frequencies of the frequency band may be measured.

Based on the results of the power scan, it may be determined on which frequency channels in the frequency band to attempt system acquisition, and according to which RAT to attempt system acquisition for each such frequency channel.

System acquisition may then be attempted on the selected frequency channels and according to the selected RAT(s). Information regarding any systems acquired via such system acquisition may then be provided to a system selection module of the wireless device, which may perform system selection based at least in part on such information.

By performing the power scan in a RAT-independent manner, and analyzing results of the power scan selectively determine on which frequency channels & RATs to attempt system acquisition in such a manner, the total time and power consumed to perform a band scan on the frequency band may be reduced relative to techniques which perform separate band scan procedures for each of multiple RATs.

Furthermore, according to the techniques described herein, it may be possible to distinguish between candidate RATs with similar channel bandwidths at a frequency channel, based on the spectral shape of signals at the frequency channel. In particular, cells deployed according to different RATs which have similar channel bandwidths may in many instances nonetheless have different spectral profiles, for example including different power roll-off characteristics. Thus, by comparing the spectral shape of signals at a particular frequency channel with spectral profiles of cells according to each of multiple candidate RATs, it may be possible to determine according to which of the candidate RATs a cell deployed at that frequency channel operates. This may further reduce the time and power consumption of the band scan procedure, as it may ensure or at least increase the likelihood that the first system acquisition attempt at such a frequency channel may use the appropriate RAT for that frequency channel.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
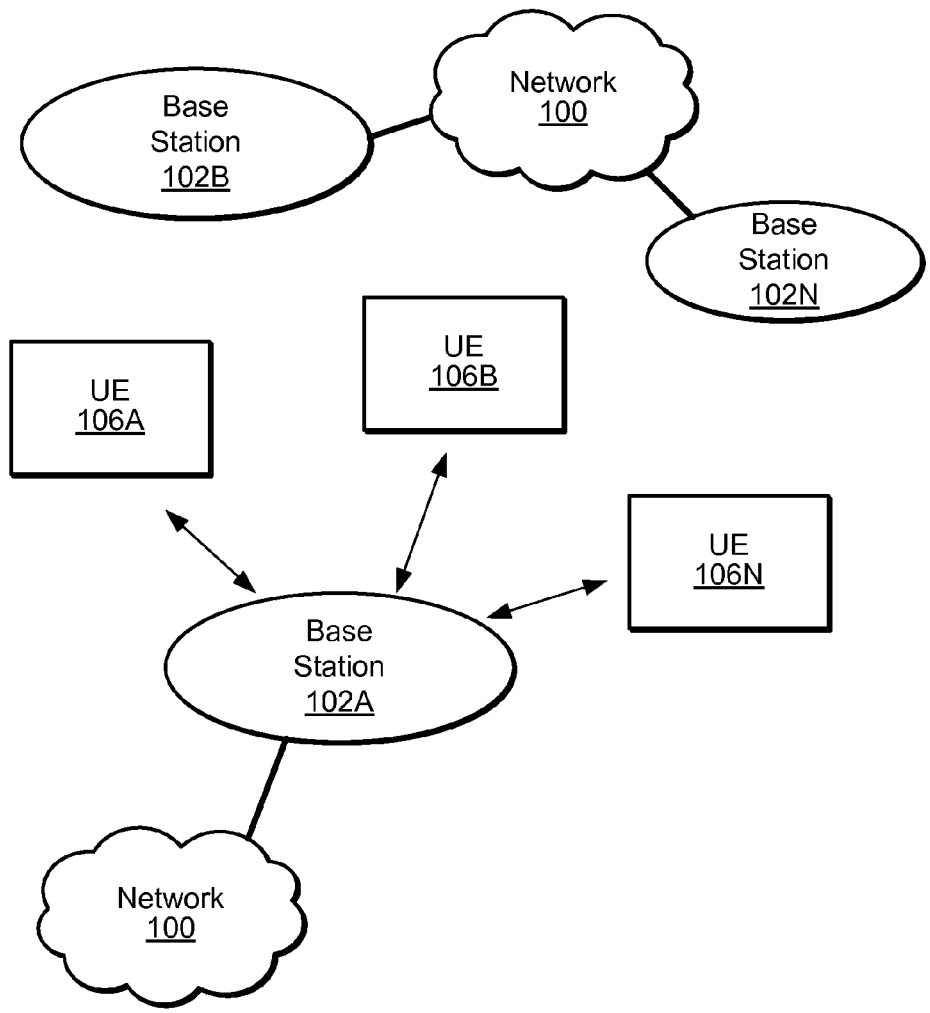
FIG. 1 illustrates an exemplary (and simplified) wireless communication system, according to one embodiment.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
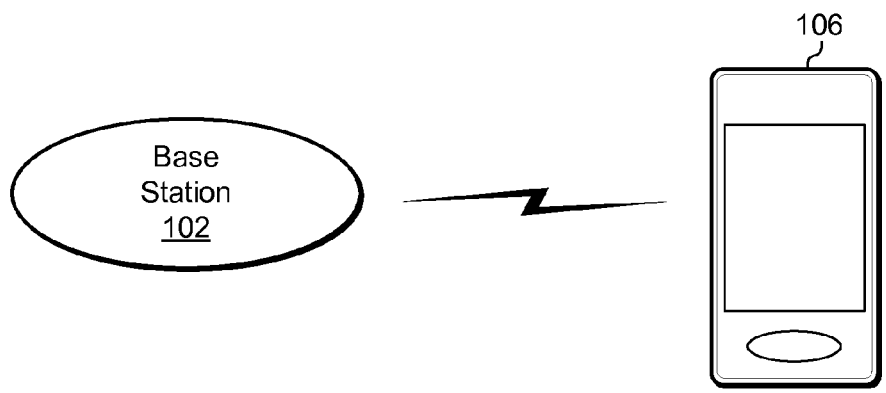
FIG. 2 illustrates a base station (BS) in communication with a user equipment (UE) device, according to one embodiment.

FIGS. 1 and 2—Communication System

FIG. 1 illustrates an exemplary (and simplified) wireless communication system, according to one embodiment. It is noted that the system of FIG. 1 is merely one example of a possible system, and that features of this disclosure may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to one embodiment. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
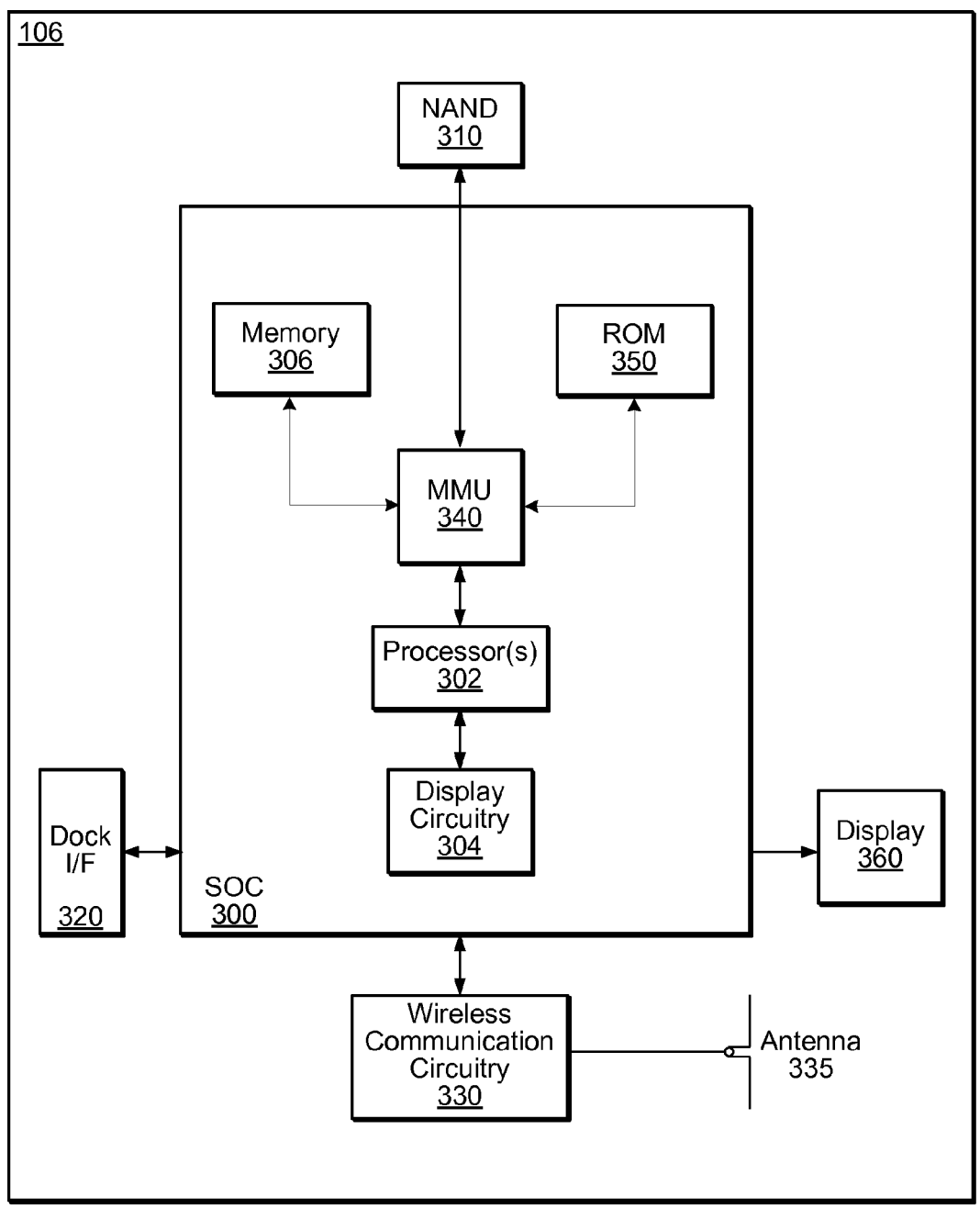
FIG. 3 illustrates an exemplary block diagram of a UE, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities) for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 5:
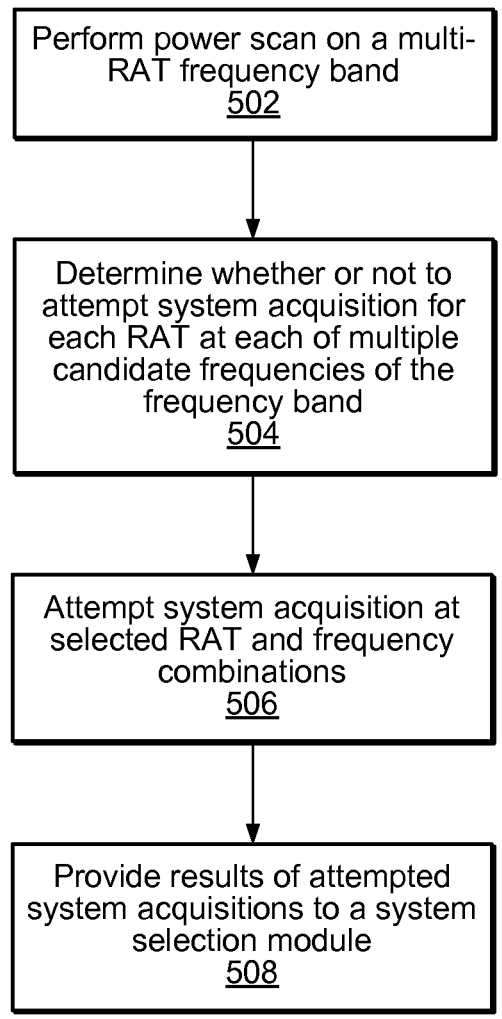
FIG. 5 is a flowchart diagram illustrating an exemplary method for a multi-RAT band scan, according to one embodiment.

As described herein, the UE 106 may include hardware and software components for implementing features for performing a multi-RAT band scan, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
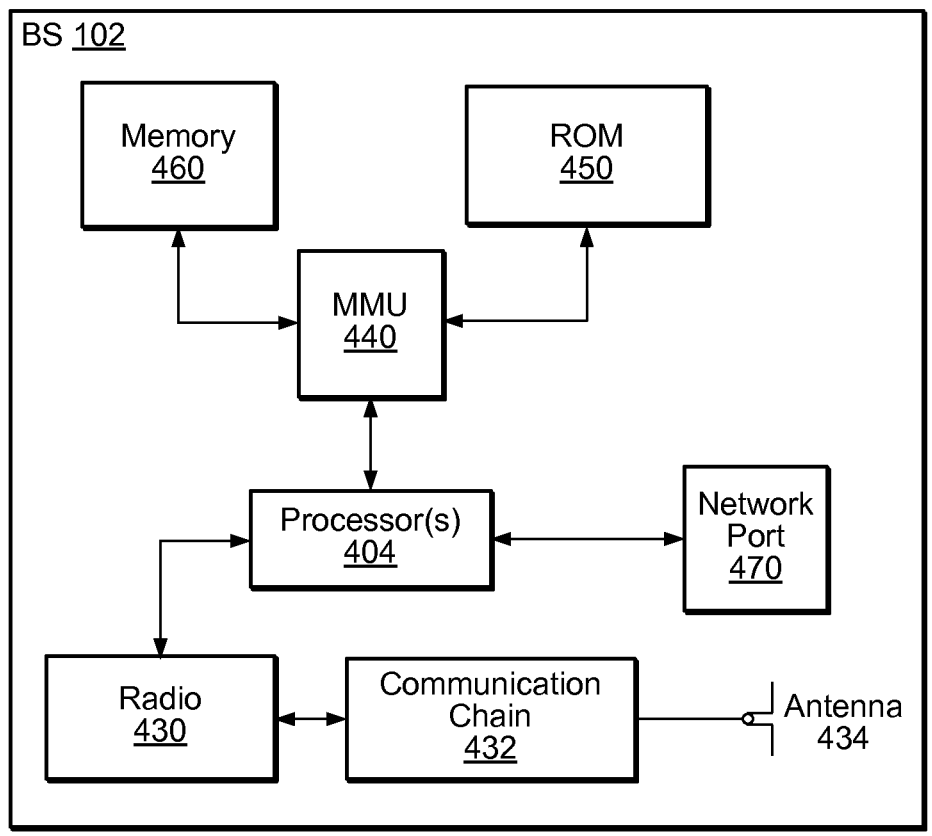
FIG. 4 illustrates an exemplary block diagram of a BS, according to one embodiment.

FIG. 4—Exemplary Block Diagram of a Base Station

FIG. 4 illustrates an exemplary block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

FIG. 5—Flowchart Diagram

As noted herein above, many UEs may be capable of receiving and transmitting using any of multiple RATs. Such a "multi-RAT UE" may utilize a system selection process to determine on which RAT the UE should be camped among the various RATs supported by the UE. The system selection algorithm used by a multi-RAT UE may be based on subscription characteristics, relative RAT priorities (e.g., based on characteristics of the device and the various supported RATs), network loading considerations, and/or any of various other considerations. System selection may be performed in a number of different situations that may arise during operation of the UE, such as during power-up, if the UE goes out-of-service (OOS), or if the UE is camped on a lower priority system (e.g., in order to potentially discover and camp on a higher priority system).

In order to perform system selection, the UE may first identify which supported RATs are available in the vicinity of the UE. This process may include a band scan procedure. For a given frequency band, the band scan may include performing a power scan on the frequencies of the band (this may also be referred to as a 'frequency scan'). From the frequency scan, suitable frequencies (e.g., based on signal strength, transmission bandwidth, etc. on a given frequency) to be considered for acquisition may be determined. For those frequencies, system acquisition may be attempted. This may include attempting to obtain time and frequency synchronization (e.g., using a Sync Channel) and decode broadcast information which identifies the system (e.g., PLMN, etc.) deployed at each such frequency channel. For those frequencies that result in successful system acquisition, certain information obtained during the band scan (such as PLMN, RSSI, (E)ARFN, etc.) may be provided to the system selection module of the UE.

As the number of RATs and frequency bands used for wireless communication according to those RATs increases, however, the challenge of performing efficient and effective RAT and band scans at a UE has also increased. Accordingly, FIG. 5 is a flowchart diagram illustrating a method for performing an efficient coordinated multi-RAT band scan. The method shown in FIG. 5 may be used in conjunction with any of the computer systems or devices shown in the above Figures, among other devices. In various embodiments, some of the elements of the method shown may be performed concurrently, in a different order than shown, or may be omitted. Additional elements may also be performed as desired. As shown, the method may operate as follows.

In 502, a power scan may be performed on a multi-RAT frequency band. The frequency band may be selected from among multiple frequency bands which the UE is configured to utilize for wireless communication. For example, a 3GPP compliant UE might be capable of communicating using any or all of GSM (e.g., in 900 MHz, 1800 MHz, 850 MHz, 1900 MHz, and/or other frequency bands), WCDMA (e.g., in band I, II, III, V, VIII, and/or other frequency bands), TD-SCDMA (e.g., in band A, band F, and/or other frequency bands), or LTE (e.g., in band 1, 2, 3, 4, 5, 7, 8, 13, 17, 25, 26, 38, 39, and/or other frequency bands). Alternatively (or in addition) a 3GPP2 compliant UE might be capable of communicating using any or all of cdmaOne or CDMA2000, in any of various associated frequency bands.

The frequency band may be selected by a system selection module or another module in the UE. For example, a band scan request for a specific frequency band may be received from the system selection module, based on which the power scan and subsequent steps of the method may be performed.

In some instances, the frequency band may be selected based on which RAT(s) (and their priorities according to the UE's configuration) are known to operate on the frequency band, the location of the UE, the configuration of the UE, and/or any of various other considerations. For example, as one possibility, the selected frequency band may be a frequency band in which a highest priority RAT is known to be deployed in the location (e.g., country, possibly based on mobile country code (MCC)) of the UE.

The power scan may include measuring transmit power at certain frequencies of the frequency band. As one possibility, power spectral density may be sequentially measured over the frequencies of the frequency band. Transmit power may also or alternatively be measured for quantized frequency bins (of any desired bin size).

Based on the power scan, it may be possible to determine that certain frequency channels of the frequency band are candidate frequencies on which cells may be deployed. For example, based on the bandwidth and/or spectral shape of signals at each such candidate frequency, it may be possible to determine that a cell of a particular RAT may be deployed on that cell.

Accordingly, in 504, it may be determined whether or not to attempt system acquisition for each RAT at each of multiple candidate frequencies of the frequency band. For each such candidate frequency, this determination may be performed based on the measured bandwidth and/or spectral shape/characteristics of signals at the given frequency. For example, the spectral shape of signals at a respective frequency may be analyzed and compared with spectral shape profiles of each of various possible RATs. If the spectral shape of signals at the respective frequency fits the spectral shape profile of a RAT, it may be determined to attempt system acquisition according to the RAT at the respective frequency. If the spectral shape of signals at the respective frequency does not fit the spectral shape profile of a RAT, it may be determined to not attempt system acquisition according to the RAT at the respective frequency. In other words, it may be determined whether or not a cell is deployed at a frequency channel according to any of multiple possible RATs based on the spectral shape analysis.

Note that each RAT may have multiple spectral shape profiles. Thus, at least in some instances, the UE may store a spectral shape profile for each of multiple possible transmission bandwidths of each RAT. For example, LTE supports variable bandwidth frequency channels ranging from 1.4 MHz to 20 MHz, so a UE which supports LTE may store a spectral shape profile for each of the various possible frequency channels bandwidths according to LTE.

The spectral shape characteristics analyzed for a given frequency channel may include any of various spectral shape characteristics. Likewise, the spectral shape profiles for the RATs may be based on any of various spectral shape characteristics. As one possibility, one or more of the spectral shape characteristics for a given frequency channel may relate to the power roll-off characteristics at edges of the frequency channel bandwidth. Similarly, the spectral shape profiles for each RAT (and for each possible transmission bandwidth according to each RAT) may be configured based at least in part on the power roll-off characteristics at edges of the frequency channel bandwidth.

As a specific example, as one possibility a spectral shape characteristic of signals measured at a particular frequency channel may be the bandwidth from a minimum frequency with signal power within a power threshold of signal power at a center frequency of the frequency channel to a maximum frequency with signal power within the power threshold of signal power at the center frequency of the frequency channel. In this case, the spectral shape profile for a RAT might include a bandwidth range specific on this spectral shape characteristic. By setting the power threshold and bandwidth ranges appropriately, it may be possible in this case to distinguish between spectral shapes of transmissions according to different RATs with similar or equal nominal frequency channel bandwidth based on the spectral shape analysis and in particular based on the differing power roll-off characteristics of transmissions according to the different RATs.

In 506, system acquisition may be attempted at selected RAT and frequency combinations. The RAT and frequency combinations selected for system acquisition attempts may be based on the measured bandwidth and/or spectral shape analysis of signals at various candidate frequencies as described with respect to step 504 herein.

System acquisition at a selected frequency may include attempting to acquire system information identifying a system (e.g., public land mobile network or PLMN) communicating at the selected frequency according to the selected RAT. At least in some instances, system acquisition may more particularly include acquiring timing and frequency synchronization and decoding broadcast information (e.g., from a system information block or SIB, as one possibility) for a cell deployed at the selected frequency according to the selected RAT. A successful system acquisition attempt may confirm the existence of a system deployed at a frequency on which system acquisition is attempted and obtain information regarding various characteristics (e.g., PLMN, RSSI, (E)ARFN, etc.) of that system. Unsuccessful system acquisition may be a result of utilizing the wrong RAT, or may be an indication that the signals detected at that frequency channel are not actually related to a system deployed on that channel, or may be an indication that the UE is not within communicative range of the system deployed on that channel, among various possibilities.

Note that as a result of the analysis of the various candidate frequencies based on the power scan, it may be the case that in some instances system acquisition initially or exclusively may be performed on a frequency channel according to a ("first") RAT for which the spectral shape characteristics of signals on the frequency channel best fit the spectral profile, and that system acquisition on the frequency channel according to a ("second") RAT for which the spectral shape characteristics of signals on the frequency channel also fit the spectral profile (but not as well) may not be performed at all, or may not be performed unless system acquisition according to the first RAT is unsuccessful.

In 508, results of the attempted system acquisitions may be provided to a system selection module. In particular, an indication may be provided to the system selection module of any systems acquired, for example including the characteristics of those systems determined as a result of successful system acquisition.

The results may be used by the system selection module to select a system on which to camp. As noted above herein, any of various algorithms, based on any of various characteristics, may be used to select a system by the system selection module, as desired.

In some instances, the system selection module may determine whether to perform system selection or obtain further information after (or during) each band scan. For example, if after a band scan of a particular frequency band, the system selection module determines that a highest-priority RAT system is available, the system selection module may determine that it is unnecessary to perform further band scans on any other frequency bands, and select the available highest-priority RAT system on which to camp. Alternatively, if it is determined that further band scanning is desired (e.g., if no highest-priority RAT system is available on any frequency bands already scanned, or for any of various other reasons), the system selection module might request a band scan on another ("second") frequency band.

In this case, steps similar to those described above (e.g., performing a power scan on the second frequency band, determining whether or not to attempt system acquisition at candidate frequencies of the second frequency band, attempting system acquisition at selected RAT/frequency combinations in the second frequency band, and providing results of attempting system acquisition at the selected RAT and frequency combinations in the second frequency band) may be performed for the second frequency band in response to the band scan request for the second frequency band. In other words, the multi-RAT band scan techniques described herein above with respect to FIG. 5 may be used for each multi-RAT frequency band scanned by the UE, if desired.

FIGS. 6-13—Additional Information

FIGS. 6-13 illustrate exemplary aspects and details of various multi-RAT band scan and system selection techniques. Aspects illustrated in and described with respect to FIGS. 6-13 may be used in conjunction with any of the computer systems or devices shown in the above Figures, among other devices. It should be noted, however, that the exemplary details illustrated in and described with respect to FIGS. 6-13 are not intended to be limiting to the disclosure as a whole: numerous variations and alternatives to the details provided herein below are possible and should be considered within the scope of the disclosure.

Figure 6:
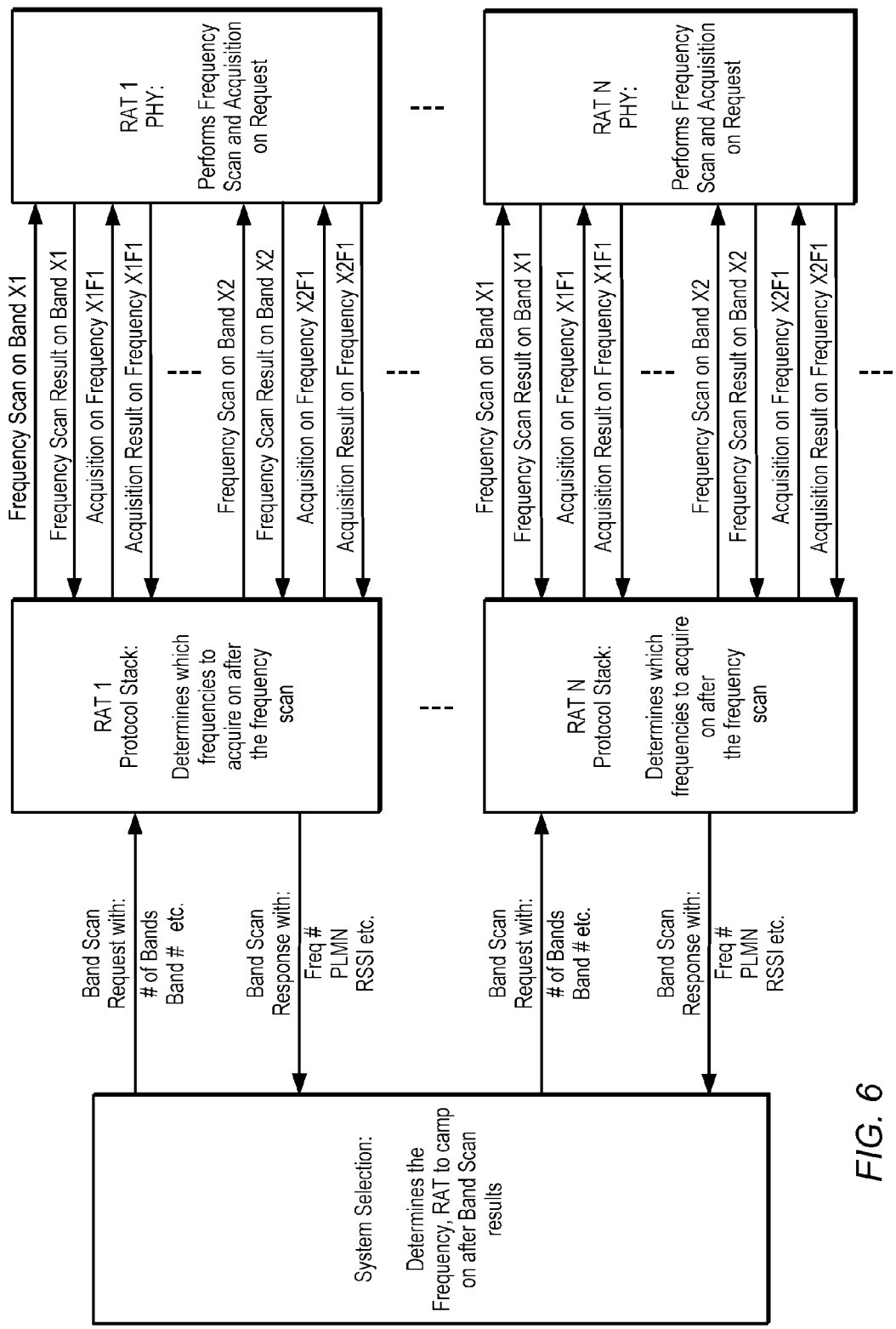
FIG. 6 illustrates an exemplary band scan methodology in which band scanning is performed separately for different RATs, according to one embodiment.

FIG. 6 illustrates an exemplary band scan methodology in which band scanning is performed separately for different RATs, according to one embodiment. As shown, according to such a methodology, the frequency scan may be performed separately for each RAT, and the decision to select on which frequencies to attempt acquisition is also made independently. Of the frequency scan and system acquisition processes, system acquisition may be the most time consuming, and so the total duration of the band scan may be largely based on the decisions of how many and on which frequencies system acquisition is attempted.

The independent/uncoordinated nature of the different RATs activities in this case may result in a considerably longer band scan time than necessary. For example, if multiple RATs transmit on the same band, according to the methodology of FIG. 6, a frequency scan of that band may be performed separately for each RAT, which may add unnecessarily to scan time. Thus, if there is a strong power measurement at a frequency in a frequency band, each RAT which may be deployed in that frequency band may perform a scan regardless of whether or not the signal is actually coming from that RAT. Furthermore, even with filtering mechanisms (such as using the same of the transmission to confirm consistent transmission bandwidth), it may be the case that some transmission bandwidths are similar between multiple RATs (e.g., as illustrated in and further described with respect to FIG. 7). Note that as the number of frequencies scanned for each RAT increases, the amount of scan time to provide acceptable performance for each RAT individually may linearly increase.

Figure 7:
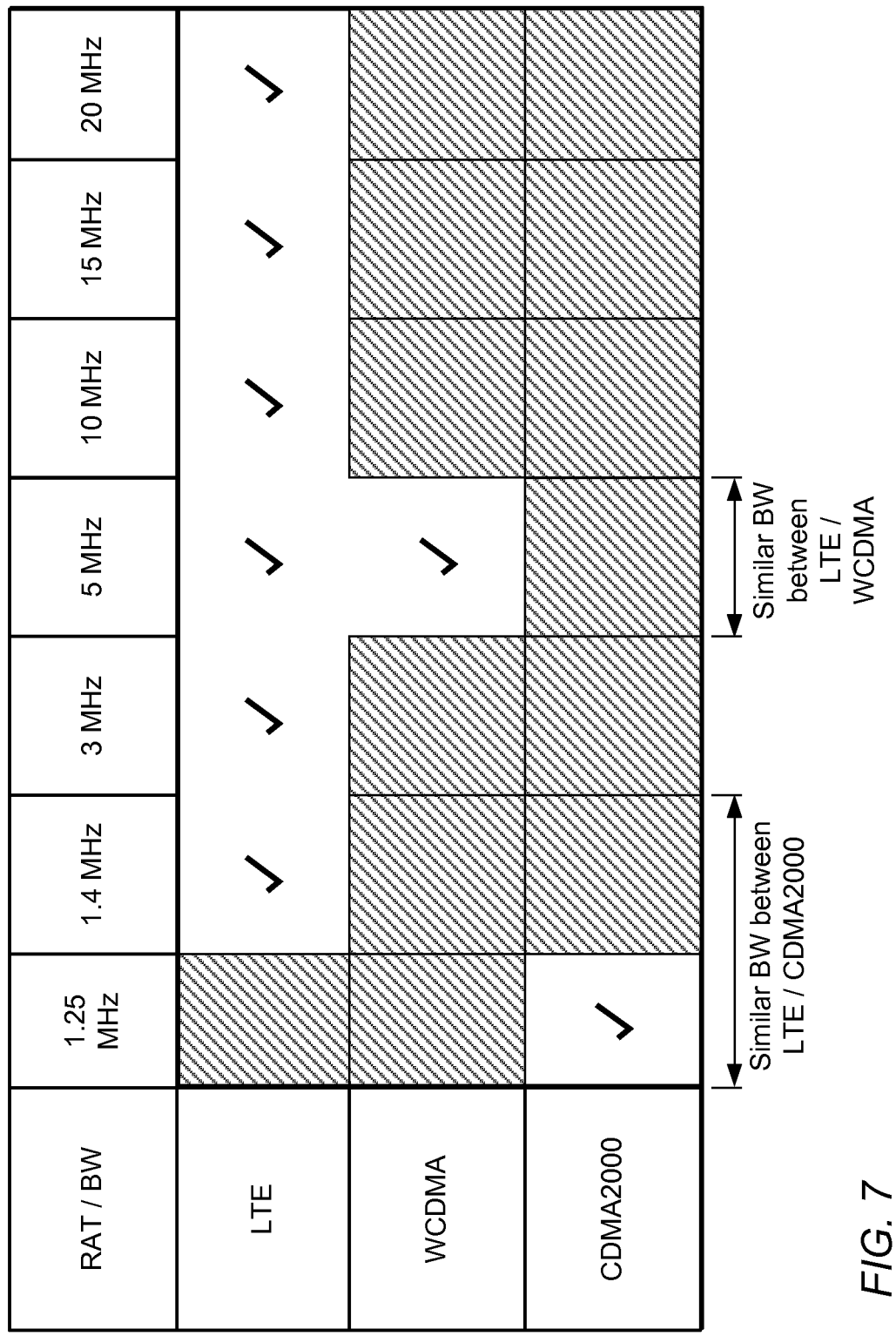
FIG. 7 illustrates transmission bandwidths of various RATs for which similar channel bandwidths may be possible, according to one embodiment.

FIG. 7 illustrates transmission bandwidths of various RATs for which similar channel bandwidths may be possible, according to one embodiment. As shown, a variety of possible transmission bandwidths may be possible for LTE, including 1.4 MHz, 3 MHz, 5 MHz, 10 MHz, 15 MHz, and 20 MHz. The 1.4 MHz bandwidth may be similar to the CDMA2000 1.25 MHz transmission bandwidth, while the 5 MHz bandwidth may be nominally equal to the 5 MHz WCDMA transmission bandwidth. Thus, for frequency channels on which such transmission bandwidths are used, ambiguity between which RAT is used may be possible which just nominal transmission bandwidth occurs. Among various other considerations, resolving such ambiguities may be one possible benefit from a multi-RAT band scan approach.

Figure 8:
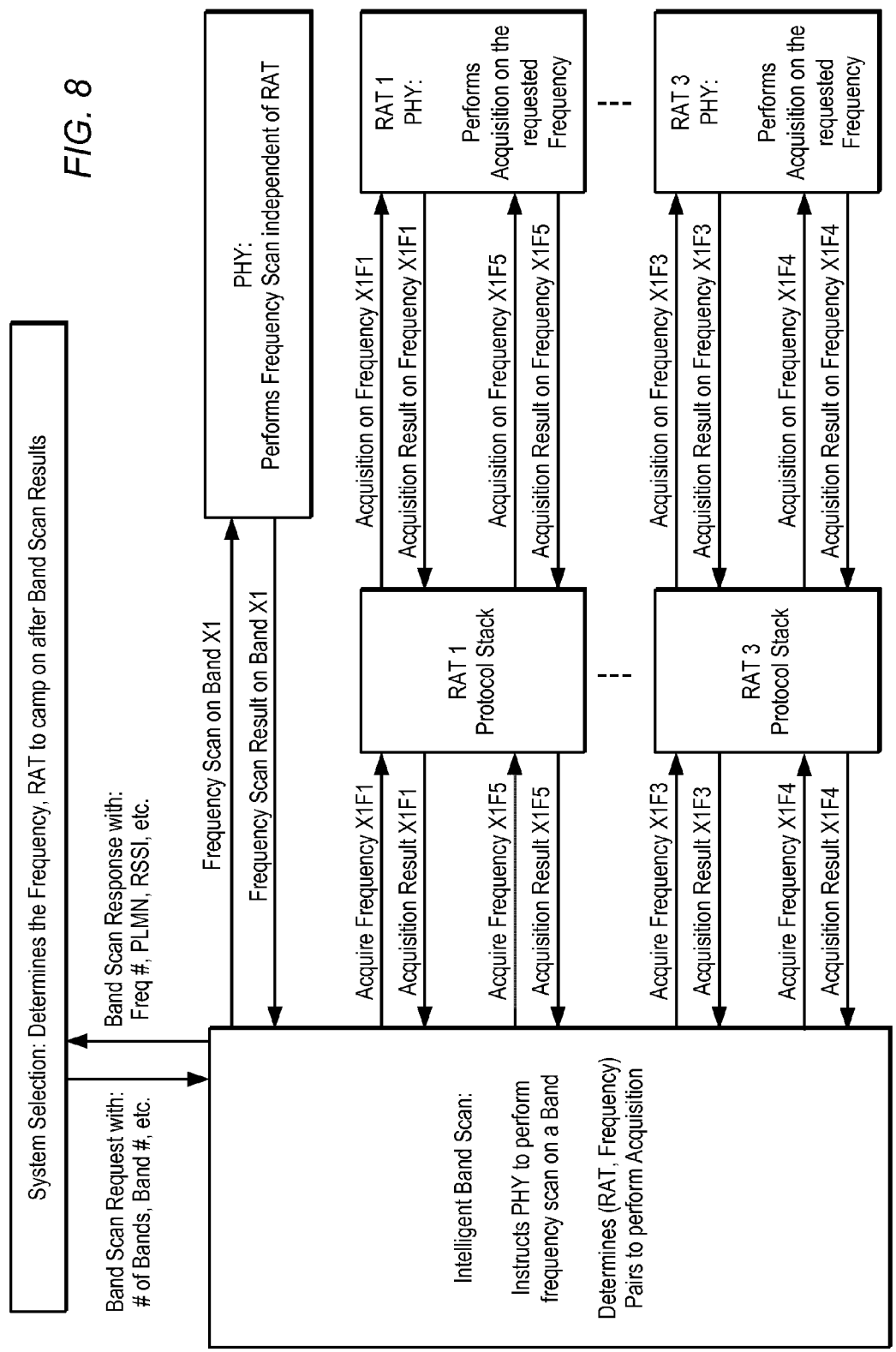
FIG. 8 illustrates an exemplary coordinated multi-RAT band scan methodology, according to one embodiment.

FIG. 8 illustrates an exemplary coordinated multi-RAT band scan methodology, according to one embodiment. In contrast to the methodology of FIG. 6, a RAT independent frequency scan may be performed, such that only one frequency scan is performed for a given frequency band regardless of the number of RATs which may be deployed on that frequency band.

Additionally, the decision whether or not to attempt acquisition on a particular RAT at a particular frequency may be determined intelligently by considering various criteria to narrow down which (RAT, Frequency) pairs to consider for acquisition. As previously noted, some such criteria may include the measured bandwidth of transmissions at a given frequency and/or spectral shape of the transmission bandwidth.

With this narrowing methodology, the number of candidates considered for acquisition may be reduced across the RATs supported by a UE implementing such a methodology without compromising system detection performance. Furthermore, it may allow the system selection procedure/module to make system selection decisions at the end of each band scan, for example in contrast to waiting for the entire scan (e.g., including multiple frequency bands) to complete.

Figure 9:
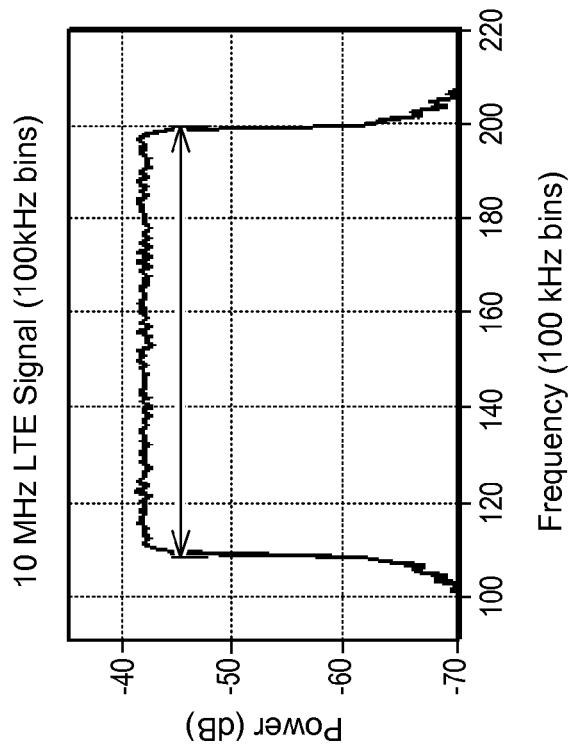
FIG. 9 illustrates an exemplary spectral shape of a 10 MHz LTE channel, according to one embodiment.
Figure 9:
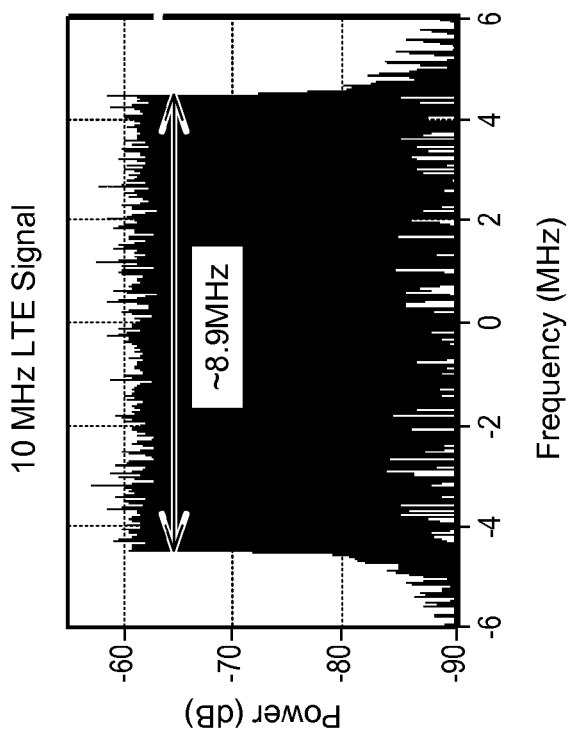
Figure 10:
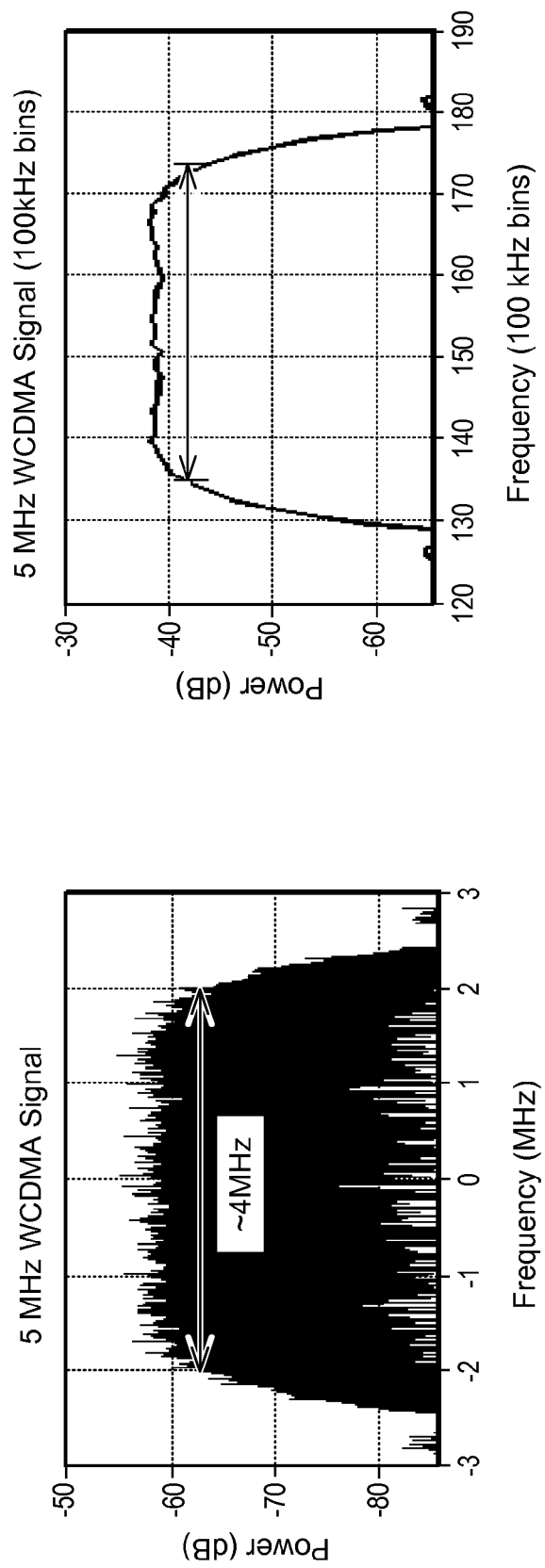
FIG. 10 illustrates an exemplary spectral shape of a 5 MHz WCDMA channel, according to one embodiment.
Figure 11:
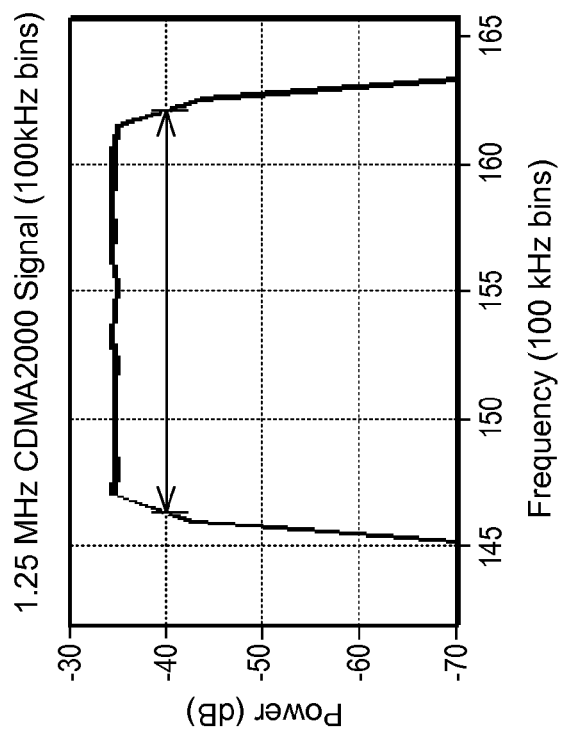
FIG. 11 illustrates an exemplary spectral shape of a 1.25 MHz CDMA2000 channel, according to one embodiment.
Figure 11:
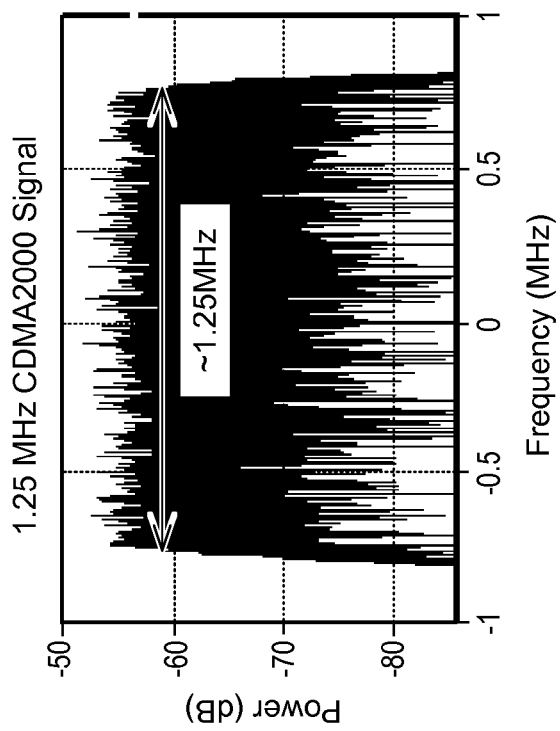

It may be possible to determine the acquisition RAT for a given frequency based on matching the measured power spectrum to the characteristic transmission bandwidth of the RAT. For example, transmissions according to different RATs may have different power spectral shapes or profiles even if they have similar nominal bandwidths. FIGS. 9-11 illustrate certain such possible different power spectral shapes exhibited by LTE, WCDMA, and CDMA2000 transmissions. FIG. 9 illustrates, in particular, an exemplary spectral shape of a 10 MHz LTE channel, according to one embodiment. FIG. 10 illustrates, in particular, an exemplary spectral shape of a 5 MHz WCDMA channel, according to one embodiment. FIG. 11 illustrates, in particular, an exemplary spectral shape of a 1.25 MHz CDMA2000 channel, according to one embodiment. As can be seen, each of the illustrated spectral shapes differs noticeably from the others, particularly in its power roll-off characteristics.

Figure 12:
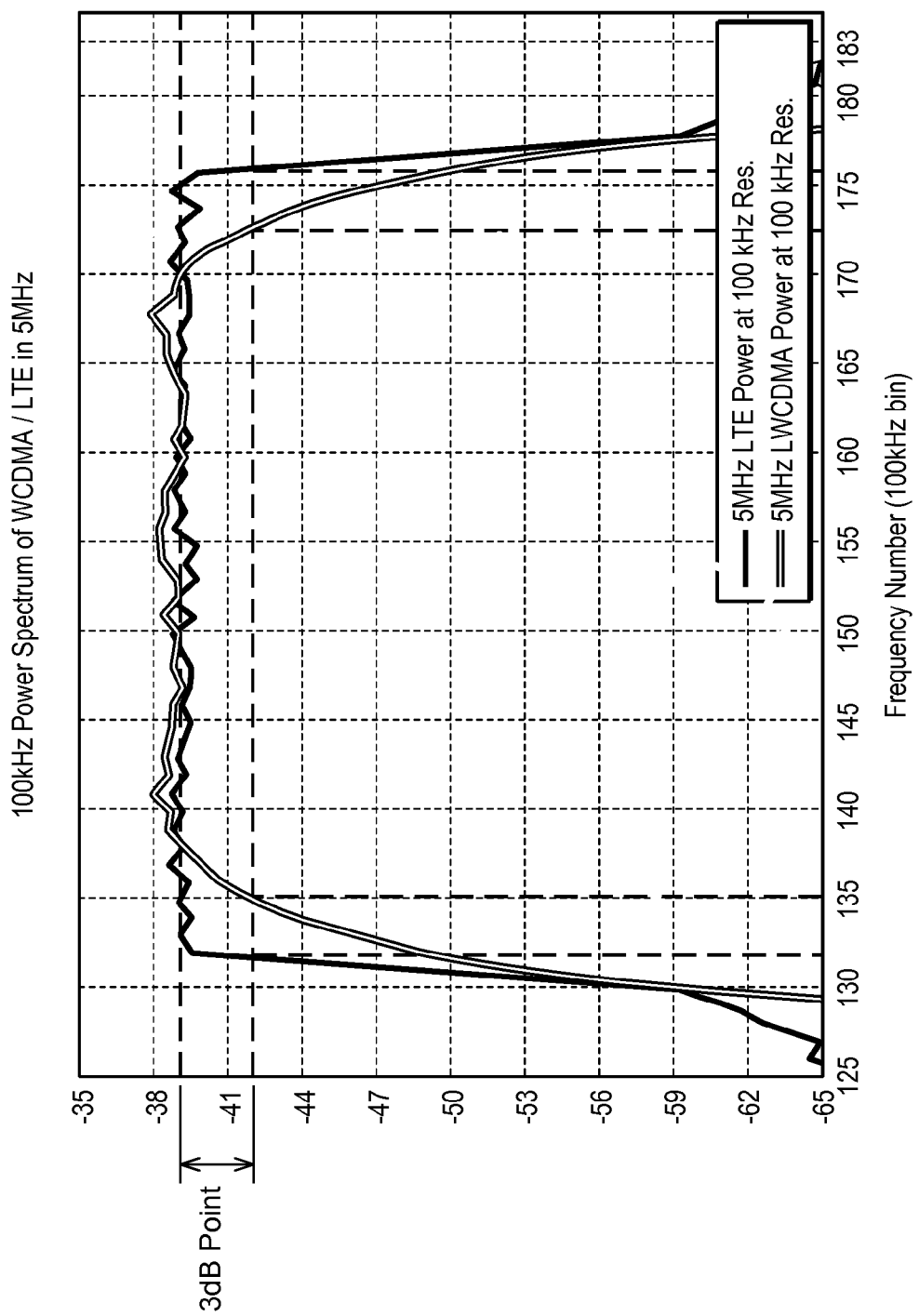
FIG. 12 illustrates exemplary overlaid spectral shapes of 5 MHz LTE and WCDMA channels, according to one embodiment.
Figure 13:
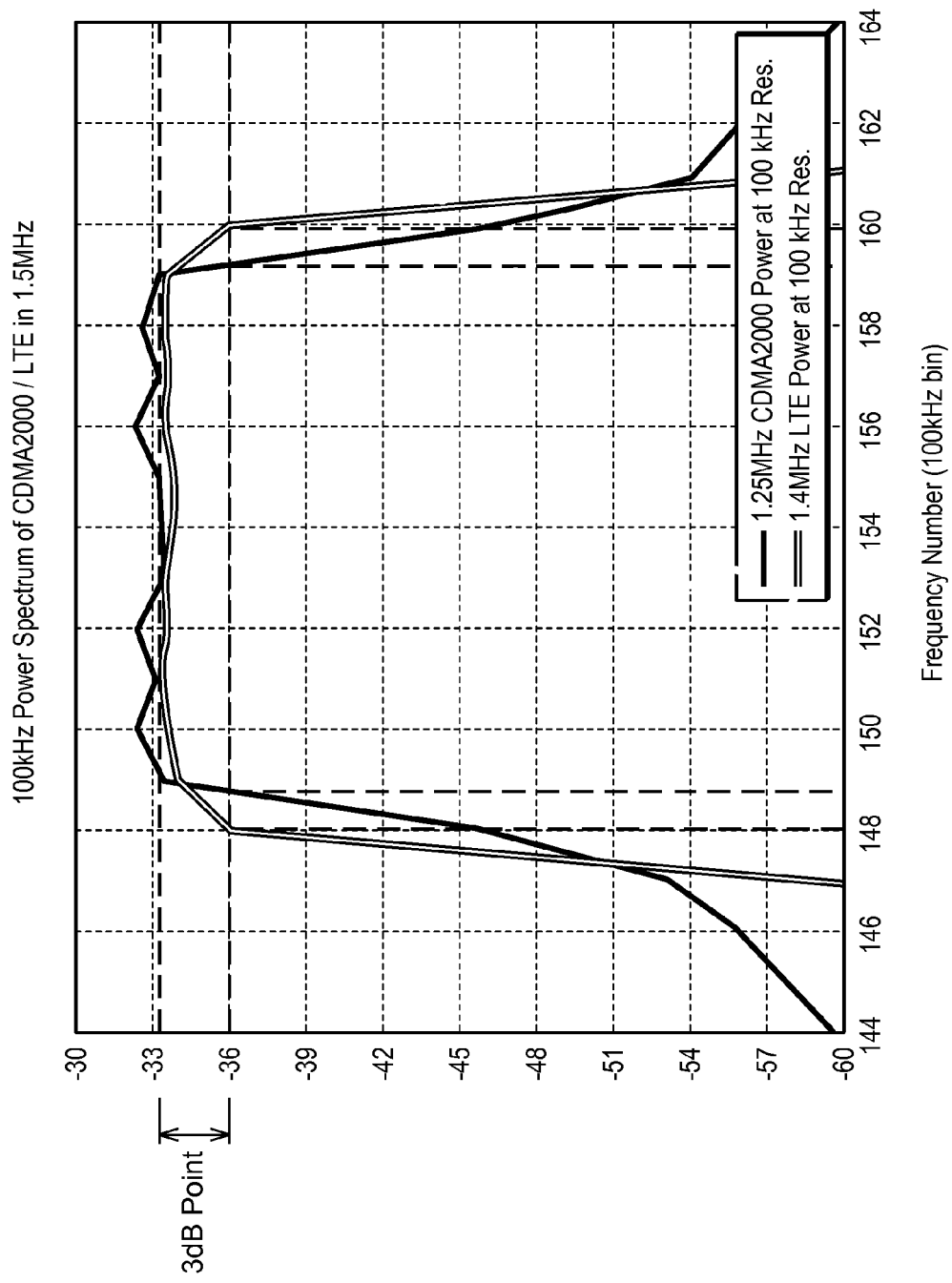
FIG. 13 illustrates exemplary overlaid spectral shapes of 1.25 MHz CDMA2000 and 1.4 MHz LTE channels, according to one embodiment.

FIGS. 12-13 further illustrate such differences between spectral shapes of transmissions having similar or equal nominal transmission bandwidth according to different RATs. FIG. 12 illustrates, in particular, exemplary overlaid spectral shapes of 5 MHz LTE and WCDMA channels, according to one embodiment, while FIG. 13 illustrates, in particular, exemplary overlaid spectral shapes of 1.25 MHz CDMA2000 and 1.4 MHz LTE channels, according to one embodiment.

As can be seen, the power roll-off at the edges of the spectrum are markedly different in each case. For such potentially ambiguous transmission bandwidths, the power spectral shape characteristics used to determine the acquisition RAT for a given frequency may be carefully selected (e.g., to relate to the power roll-off features) to enable the UE to distinguish between differing spectral shapes of according to different RATs.

As one possibility, the spectral shape profile for a given RAT (and for a given transmission bandwidth for that RAT) may include a transmission bandwidth determined for a given center frequency $f_c$ as follows:

$$BW = \begin{cases} BW_{i,RAT} & \text{if } BW_{i,RAT} - Th_{BW} \leq f_h - f_l \leq BW_{i,RAT} \\ \text{Not Applicable} & \text{Otherwise} \end{cases}$$

where:

$f_l = \min(f)$, $f_h = \max(f)$ satisfying $I(f, f_c) = 1$, $f_c - \dfrac{BW_{i,RAT}}{2} \leq f \leq f_c + \dfrac{BW_{i,RAT}}{2}$ $I(f, f_c) = \begin{cases} 1, & \text{if } P(f_c) - P(f) \leq Th_{dB} \\ 0, & \text{Otherwise} \end{cases}$ The index i may be used in this exemplary possibility to address scenarios where a RAT (such as LTE) can have multiple transmission bandwidths. The power and bandwidth thresholds $Th_{dB}$ and $Th_{BW}$ can be designed appropriately for different RATs. For example, these thresholds may be configured to capture the specific power roll-off characteristics of a given RAT. As one such possibility, considering the spectral shapes illustrated in FIG. 12, in order to distinguish between 5 MHz WCDMA and LTE transmissions, the $Th_{dB}$ and $Th_{BW}$ thresholds might be selected as:

for WCDMA: $Th_{dB}$=6 dB and $Th_{BW}$=1.2 MHz for LTE: $Th_{dB}$=6 dB and $Th_{BW}$=0.7 MHz It should be noted that while these values represent one possible exemplary set of threshold values which may be used to distinguish between RATs using spectral shape differences, any of various other threshold values (or more generally, spectral shape profiles/definitions) may be used as desired. Thus, by designing these thresholds carefully, the probability of selecting an incorrect RAT with which to perform system acquisition for a given bandwidth may be minimized.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
a radio; and
a processing element;
wherein the radio and the processing element are configured to:
perform a power scan of a frequency band on which wireless communication using any of two or more radio access technologies (RATs) is supported by the UE;
determine whether or not to attempt system acquisition according to each of the two or more RATs at each of a plurality of frequencies of the frequency band, based at least in part on the power scan of the frequency band, wherein determining whether or not to attempt system acquisition comprises comparing spectral shape characteristics of signals measured at the frequencies with spectral shape profiles for each of the at least two RATs, wherein it is determined that a cell is deployed at the frequency according to a RAT if the spectral shape characteristics of signals measured at the frequency fit a spectral shape profile for the RAT, wherein the spectral shape characteristics of signals measured at a frequency comprise signal bandwidth from a minimum frequency with signal power within a power threshold of signal power at a center frequency of the frequency to a maximum frequency with signal power within the power threshold of signal power at the center frequency of the frequency;
attempt system acquisition at selected RAT and frequency combinations based on said determining, wherein attempting system acquisition comprises attempting to acquire system information identifying a system communicating at the selected frequency according to the selected RAT; and
provide results of attempting system acquisition at the selected RAT and frequency combinations to a system selection module.

2. The UE of claim 1,
wherein the UE stores one or more spectral shape profile for each of the two or more RATs,
wherein a spectral shape profile for a RAT is configured based on a channel bandwidth according to the RAT and power roll-off characteristics according to the RAT for the channel bandwidth.

3. The UE of claim 1, wherein the radio and the processing element are further configured to:
receive a band scan request from the system selection module for the frequency band,
wherein performing the power scan on the frequency band, determining whether or not to attempt system acquisition at each of the plurality of frequencies of the frequency band, attempting system acquisition at selected RAT and frequency combinations, and providing results of attempting system acquisition at the selected RAT and frequency combinations are performed in response to the band scan request for the frequency band.

4. The UE of claim 3, wherein the radio and the processing element are further configured to:

receive a band scan request from the system selection module for a second frequency band; and
perform a power scan of the second frequency band, determine whether or not to attempt system acquisition at each of a plurality of frequencies of the second frequency band, attempt system acquisition at selected RAT and frequency combinations in the second frequency band, and provide results of attempting system acquisition at the selected RAT and frequency combinations in the second frequency band in response to the band scan request for the second frequency band.

5. The UE of claim 1,
wherein system acquisition comprises acquiring timing and frequency synchronization and decoding broadcast system information for a cell deployed at a frequency according to a RAT.

6. A non-transitory computer accessible memory medium comprising program instructions which, when executed at a wireless user equipment (UE) device, cause the UE to:
select a frequency band to scan for frequency channels on which cells according to each of at least two radio access technologies (RATs) are deployed;
perform a power scan of the frequency band;
for each of one or more frequency channels of the frequency band:
analyze spectral shape of signals measured at the frequency channel;
determine whether or not a cell is deployed at the frequency channel according to any of the at least two RATs based on the spectral shape analysis, wherein analyzing spectral shape of signals measured at the frequency channel and determining whether or not a cell is deployed at the frequency channel according to any of the at least two RATs comprises comparing spectral shape characteristics of signals measured at the frequency channel with spectral shape profiles for each of the at least two RATs, wherein it is determined that a cell is deployed at the frequency channel according to a RAT if the spectral shape characteristics of signals measured at the frequency channel fit a spectral shape profile for the RAT, wherein the spectral shape characteristics of signals measured at a frequency channel comprise signal bandwidth from a minimum frequency with signal power within a power threshold of signal power at a center frequency of the frequency channel to a maximum frequency with signal power within the power threshold of signal power at the center frequency of the frequency channel;
selectively attempt system acquisition on frequency channels of the frequency band according to selected RATs.

7. The memory medium of claim 6, wherein when executed, the program instructions further cause the UE to:
distinguish between a first RAT and a second RAT having equal nominal frequency channel bandwidth for a cell deployed at a frequency channel of the frequency band based on analyzing the spectral shape of signals measured at the frequency channel.

8. The memory medium of claim 6, wherein when executed, the program instructions further cause the UE to:
perform system selection based at least in part on results of selectively attempting system acquisition on frequency channels of the frequency band according to the selected RATs.

9. A method for operating a wireless user equipment (UE) device, the method comprising:
by the UE:

selecting a frequency band to scan for frequency channels on which cells according to each of at least two radio access technologies (RATs) are deployed;

performing a power scan of the frequency band;

determining that a frequency channel on the frequency band is a candidate cell according to two or more RATs based on the power scan;

analyzing spectral shape of signals on the frequency channel based on determining that the frequency channel is a candidate cell according to two or more RATs;

selecting a RAT of the two or more RATs with which to attempt system acquisition on the frequency channel based on the spectral shape of signals on the frequency channel, wherein analyzing spectral shape of signals and selecting a RAT of the two or more RATs with which to attempt system acquisition on the frequency channel comprises: comparing spectral shape characteristics of signals at the frequency channel with spectral shape profiles for each of the two or more RATs and selecting a RAT of the two or more RATs if the spectral shape characteristics of signals at the frequency channel fit a spectral shape profile for the RAT, wherein the spectral shape characteristics comprise signal bandwidth from a minimum frequency with signal power within a power threshold of signal power at a center frequency of the frequency channel to a maximum frequency with signal power within the power threshold of signal power at the center frequency of the frequency channel, and wherein each spectral shape profile for a RAT comprises a bandwidth range configured based on the spectral shape characteristics for a transmission bandwidth of the RAT; and attempting system acquisition on the frequency channel with the selected RAT.

10. The method of claim 9,
wherein analyzing spectral shape of signals on the frequency channel is based at least in part on power roll-off at edges of the frequency channel bandwidth.

11. The method of claim 9,
determining that one or more additional frequency channels on the frequency band are candidate cells according to one or more RATs based on the power scan;

analyzing spectral shape of signals on the one or more additional frequency channels on the frequency band based on determining that the one or more additional frequency channels are candidate cells according to one or more RATs;

selecting a RAT with which to attempt system acquisition on each of the one or more additional frequency channels based on the spectral shape of signals on each of the one or more additional frequency channels; and attempting system acquisition on each of the one or more additional frequency channels with the selected RAT for each of the one or more additional frequency channels.

12. The method of claim 11, the method further comprising:

determining whether to perform system selection based on results of the system acquisition attempts or perform a band scan on an additional frequency band.

13. The method of claim 9,
wherein the frequency band is selected from two or more frequency bands in which the UE is configured to operate based on RAT priority considerations.

* * * * *